United States Patent [19]

Smith

[11] Patent Number: 4,632,473
[45] Date of Patent: Dec. 30, 1986

[54] CABINET ASSEMBLY

[75] Inventor: Richard C. Smith, Minneapolis, Minn.

[73] Assignee: R. C. Smith Company, Minneapolis, Minn.

[21] Appl. No.: 544,525

[22] Filed: Oct. 24, 1983

[51] Int. Cl.⁴ .......................................... A47B 47/03
[52] U.S. Cl. ............................ 312/257 SK; 211/182;
   211/189; 248/243; 312/140; 312/330 R;
   403/231; 403/252
[58] Field of Search ............... 403/252, 253, 254, 231;
   211/191, 187, 182, 189, 192; 248/188, 243, 245;
   308/3.6; 312/257 SK, 257 A, 140, 205, 330 R

[56] References Cited

U.S. PATENT DOCUMENTS

| 3,133,768 | 5/1964 | Klakovich | 308/3.6 |
| 3,272,582 | 9/1966 | Anderson et al. | 211/182 X |
| 3,332,374 | 7/1967 | Ferdinand et al. | 211/182 X |
| 3,716,284 | 2/1973 | Vogt | 308/3.6 X |
| 3,887,288 | 6/1975 | Glaser | 211/189 X |
| 3,912,410 | 10/1975 | Pofferi | 211/182 X |
| 3,936,111 | 2/1976 | Mazzucconi | 211/182 X |
| 4,116,509 | 9/1978 | Smith | 211/187 X |
| 4,147,393 | 4/1979 | Nelson et al. | 308/3.6 |
| 4,352,587 | 10/1982 | Milz | 403/252 |
| 4,500,146 | 2/1985 | Peterson | 211/187 X |

FOREIGN PATENT DOCUMENTS

| 2053228 | 5/1972 | Fed. Rep. of Germany | 403/252 |
| 2100545 | 7/1972 | Fed. Rep. of Germany | 211/192 |
| 2940915 | 4/1981 | Fed. Rep. of Germany | 108/154 |
| 686687 | 7/1930 | France | 403/231 |
| 1077516 | 11/1954 | France | 108/156 |
| 7529 | of 1913 | United Kingdom | 403/231 |

Primary Examiner—Kenneth J. Dorner
Assistant Examiner—Thomas A. Rendos
Attorney, Agent, or Firm—James R. Haller; Gregory P. Kaihoi

[57] ABSTRACT

An improved cabinet assembly for quick and easy assembly into various configurations. The assembly is characterized in one embodiment, by a unique joint where three framework members meet. A vertical post is equipped with vertically spaced slots. A first crossbar has prongs at one end which are snugly received in the slots, and, upon vertical movement of the crossbar, lock the crossbar to the post. A second crossbar joins the first crossbar and vertical post at mutually perpendicular angles, and is equipped with two pins which are snugly received in holes in the post. When both crossbars are in position, a bolt is inserted through the post and into the end of the second crossbar where it is secured. The bolt engages an edge of one of the prongs of the first crossbar, preventing vertical movement of the crossbar to retain it in the locked position. In another embodiment, the assembly is characterized by a drawer slide which has prongs at each end receivable in the facing slots of two parallel vertical posts. The prongs at one end of the drawer slide are adjustable lengthwise of the slide, allowing the slide to be rigidly inserted after the cabinet is assembled.

10 Claims, 11 Drawing Figures

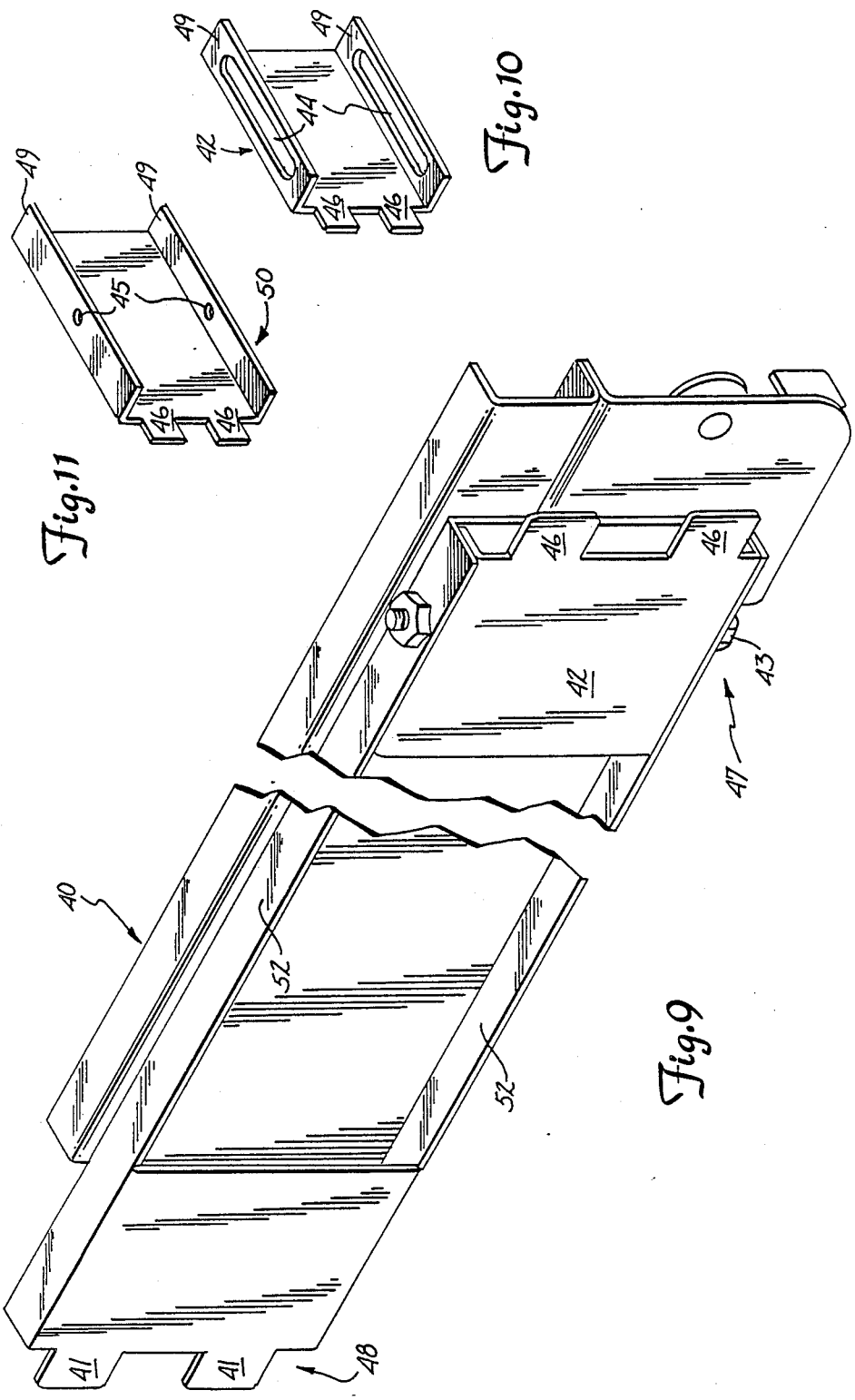

CABINET ASSEMBLY

FIELD OF THE INVENTION

The invention relates to an improved cabinet assembly. More specifically, the invention relates to a three-dimensional framework for cabinets and drawers which can be quickly and easily assembled into various configurations.

BACKGROUND OF THE INVENTION

In many areas of commerce, particularly the scientific, medical, and pharmaceutical areas, a need exists for cabinets offering economical storage and countertop space that can be adapted to a variety of uses and configurations, and that also can be readapted to other configurations at low cost and with minimal mechanical expertise as project demands and space requirements change over time. Although various types of modular storage cabinets and countertops have been manufactured to meet this need, such units are frequently substantially impossible or impractical to adapt to new configurations without considerable expense or the employment of skilled workmen to effect such changes.

BRIEF DESCRIPTION OF THE INVENTION

The invention relates generally to a three-dimensional cabinet framework. One facet of the invention involves the joint where a post and two frame members meet at mutually perpendicular angles. Such framework includes: a vertical post having an end portion with vertically spaced slots; a first horizontal crossbar having an end terminating in one or more prongs receivable in slots of the vertical post, the prongs including means for locking and unlocking the first crossbar to and from the post in response to vertical movement of the crossbar with respect to the post; a second horizontal crossbar disposed at a right angle to the first crossbar and including engagement means engageable with the post for preventing rotational and vertical movement thereof with respect to the vertical post when the post and second crossbar are affixed together; and means for removably fastening the end of the second crossbar to the vertical post and for preventing vertical unlocking movement of the first crossbar with respect to the post.

In a preferred embodiment, the vertical post is generally tubular and of rectangular cross-section, the slots being formed in one or more of the four walls of the post. The post and two crossbars are all mutually perpendicular. The first crossbar has two or more and preferably three prongs, and the locking means comprises a vertical notch in two or more of the prongs and oriented to snugly receive edges of the slots in the post upon vertical movement of the prongs after insertion of the prongs into the slots. The engagement means of the second crossbar comprises two or more spaced pins fixed to the end of the second crossbar, the pins being received snugly in spaced apertures in the vertical post. The means for fastening the end of the second crossbar to the vertical post desirably comprises a bolt extending through the post into the end of the second crossbar, the bolt being positioned adjacent to an upper edge of a prong when the prongs are in the locked position to block upward vertical movement of the prong. (Note that the assembly may be inverted as shown in FIG. 2; the bolt is then adjacent a lower edge of a prong, and blocks downward movement of the prong.) Through the unique joint thus formed, three mutually perpendicular structural members of the framework can be rigidly joined through the use of a single bolt.

A second facet of the invention relates to the rigid insertion of an elongated drawer slide after a cabinet framework has been at least partially assembled. Upon assembly of a simple framework including at least two spaced vertical posts having confronting slotted walls, the drawer slide having one or more prongs at each of its ends is then inserted between these two posts. The drawer slide is characterized by including prong-bearing adjustment means positionable along the length of the drawer slide adjacent at least one end thereof. The prongs at each end of the drawer slide are aligned with and are inserted into slots formed in respective posts, the insertion step including the step of adjusting the adjustment means longitudinally of the drawer slide so as to secure each prong within its respective slot. In a preferred embodiment, the drawer slide includes longitudinally extending parallel rails and the adjustment means comprises a prong-bearing plate slidably carried by the rails. Locking means are provided to lock the plate to the drawer slide against longitudinal movement. The plate is thus lockingly adjustable lengthwise of the drawer slide, and therefore the drawer slide can be inserted between the posts without removing the plate by merely sliding it lengthwise of the drawer slide and then locking the plate to the slide.

BRIEF DESCRIPTION OF THE DRAWING

FIG. 9 is a perspective view of a drawer slide of the invention;

FIG. 10 is a perspective view of a plate carried by the drawer slide of FIG. 9; and FIG. 11 is a perspective view of a modified plate of FIG. 10.

DETAILED DESCRIPTION OF THE PREFERRED EMBODIMENT

Figure 1:
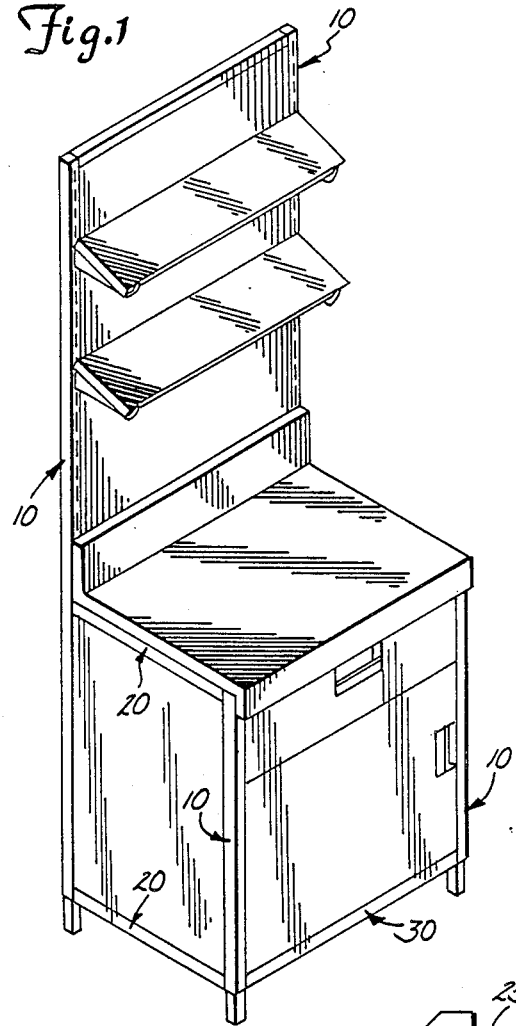
FIG. 1 is a perspective view of a completed cabinet utilizing the invention.

FIG. 1 depicts a typical cabinet assembly having two shelves, a countertop, a drawer, and one door for underneath storage.

Figure 2:
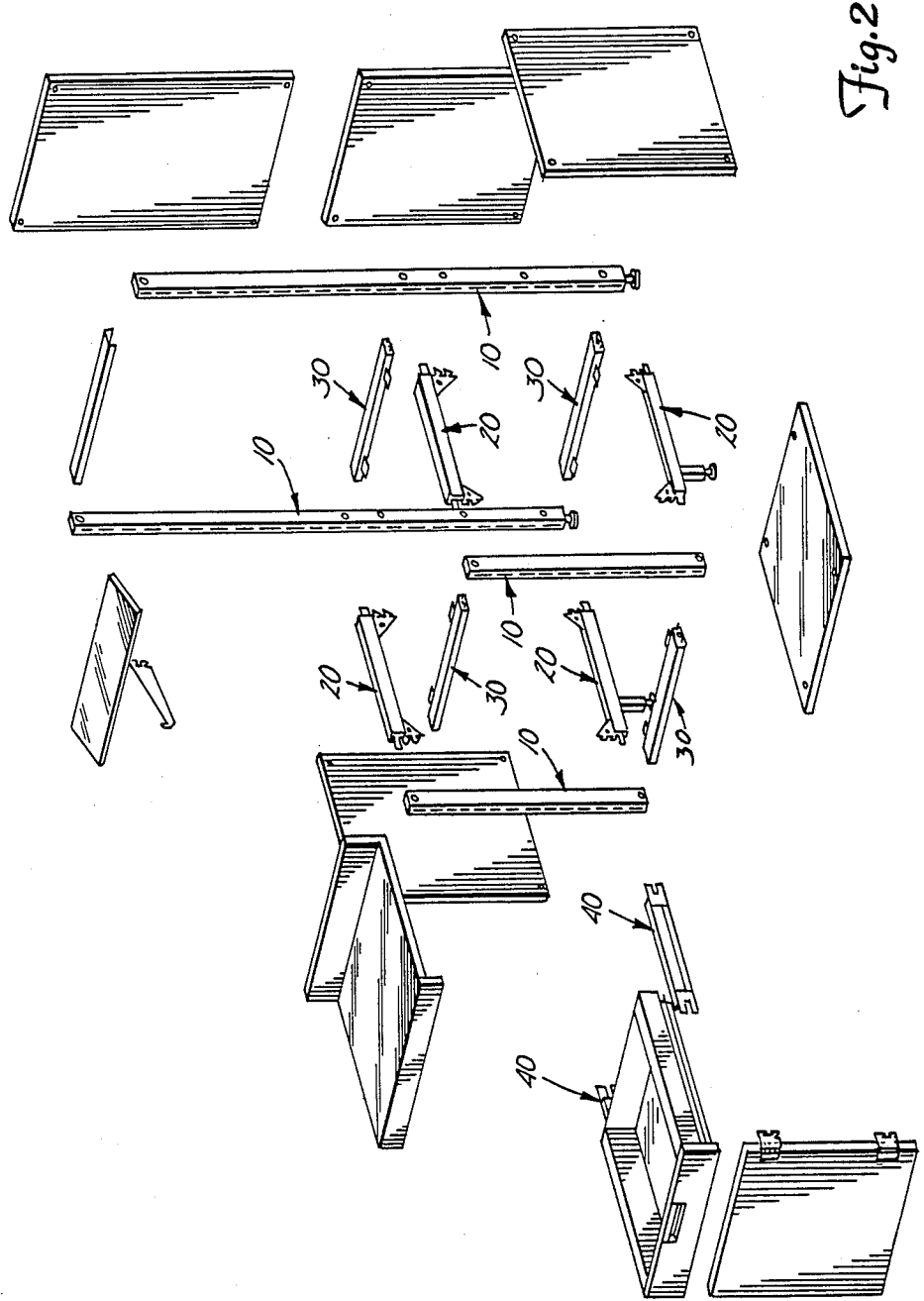
FIG. 2 is an exploded view of the cabinet of FIG. 1.

FIG. 2 is an exploded view of the cabinet of FIG. 1, showing the details of the construction of this particular unit. As can be seen from FIG. 2, the basic frame structure of the cabinet consists of four vertical posts (10), four horizontal crossbars generally designated (20), and four additional crossbars generally designated as (30). FIG. 2 also depicts the drawer slides (40) which may be inserted between the vertical posts (10).

Figure 3:
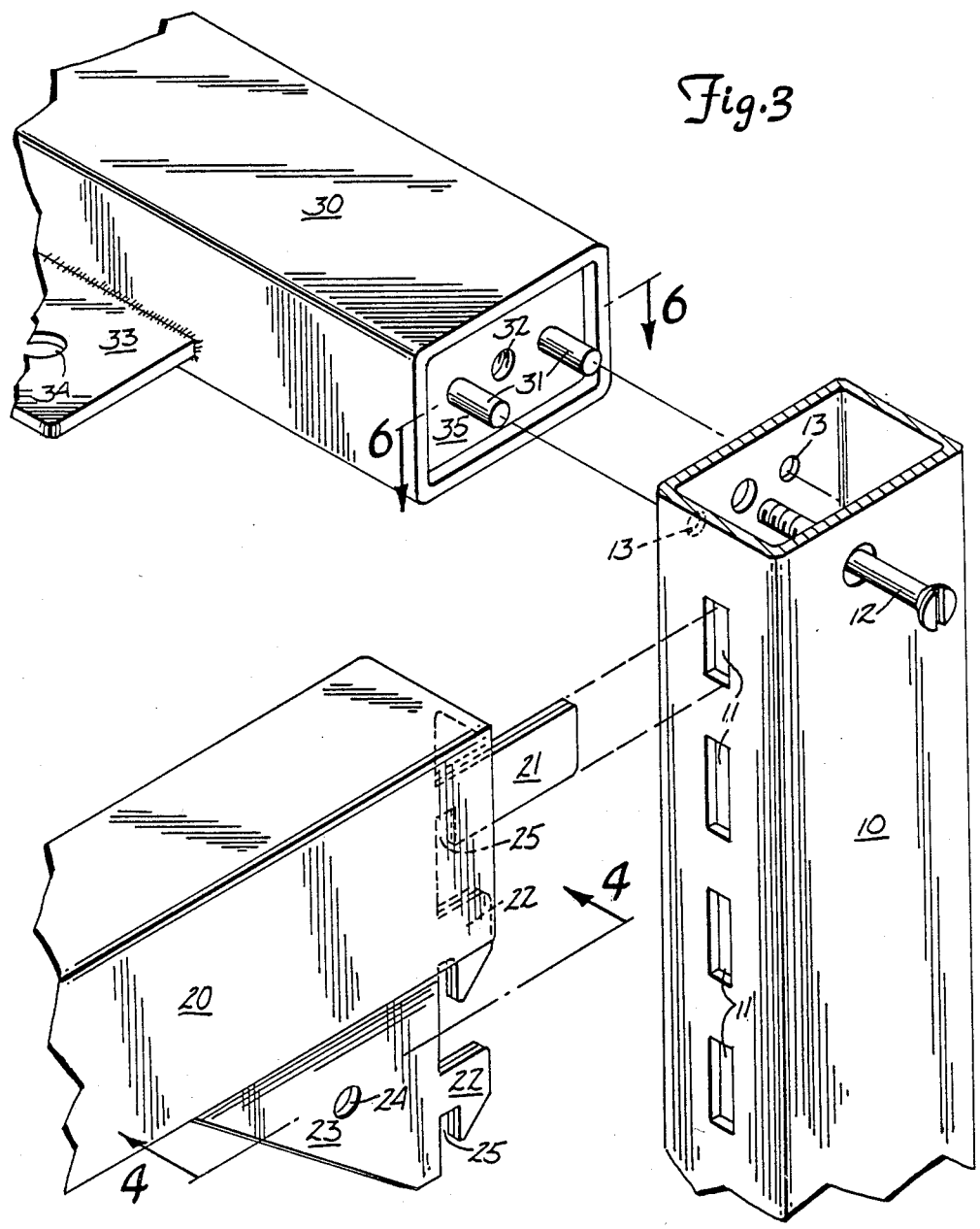
FIG. 3 is an exploded broken away perspective view of a joint utilizing an embodiment of the invention.

The invention in one embodiment relates to the joint where one crossbar (20) joins another crossbar (30) at a vertical post (10), one such joint being depicted in FIG. 3. The vertical post (10) is equipped with vertically spaced and desirably vertically elongated and aligned slots (11) along the length of at least one of its walls. The post preferably is tubular and generally rectangular in cross-section, although other shapes may also be utilized. The end of the crossbar (20) is equipped with one or more prongs, (21) and (22), preferably three in number. Each prong is positioned to correspond with and be received within a respective slot (11) of the vertical post (10) and has a vertical notch (25) positioned so that when the prongs are inserted into the slots (11) and then moved vertically the notches (25) receive the edges of the slots (11) to rigidly lock the crossbar (20) to the post (10).

The second crossbar (30), as depicted in FIG. 3, has an end that abuts the vertical post (10) perpendicular to the first crossbar (20). The end of the crossbar (30) is provided with means for strengthening the joint and for preventing rotational and vertical movement of the crossbar (30) with respect to the post, such means preferably including two or more spaced pins (31) carried by the end of the crossbar (30) and snugly received in corresponding apertures (13) in the wall of the vertical post (10) adjacent the slotted wall.

The entire joint is secured by fastening means which both fastens the second crossbar (30) to the post (10) and in so doing retains the first crossbar (20) in its locked position. Preferably, this means comprises a bolt (12) which passes through both walls of the vertical post (10) and is received by a threaded aperture (32) formed in the end of the second crossbar (30). By tightening this bolt, the crossbar (30) is firmly fastened to the post (10), and the bolt is positioned in the post (10) such that it abuts along its length an upper edge of one of the prongs (21) of the first crossbar (20), thereby retaining the first crossbar (20) in its locked position.

As will now be seen, a framework for an entire cabinet unit, as shown in FIGS. 1 and 2, can be assembled into a rigid structure through the use of bolts (12) or equivalent fastening means. Because assembly is so easy, units can be warehoused, sold, and shipped in broken down form, reducing costs, and can then be assembled quickly on site. Easy breakdown and re-assembly also facilitates adaptation to changing storage needs. Further, since the cross members and posts can be readily manufactured in a standard variety of lengths, manufacturing costs are minimized.

Figure 4:
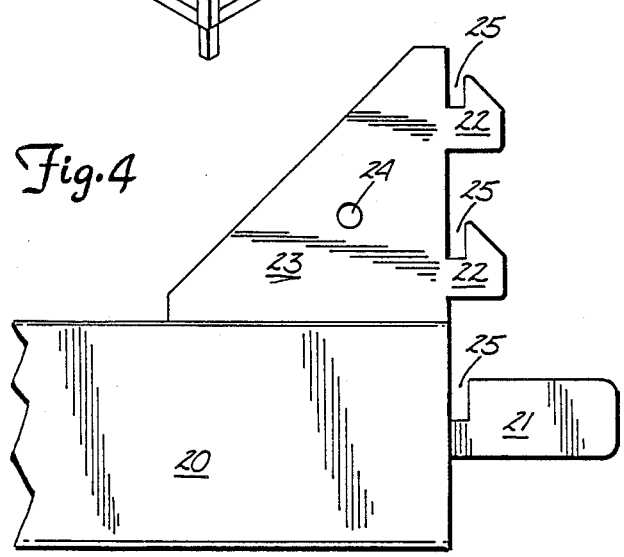
FIG. 4 is a broken away side view of the end of a crossbar shown in FIG. 3 taken along line 4—4 thereof.

FIG. 4 typifies the pronged end of a first crossbar (20). This crossbar is equipped with three prongs including one prong (21) elongated to engage the fastening bolt (12), and two other prongs (22) for added stability. All three prongs are carried by a plate (23) that in turn is secured to the crossbar (20), preferably by welding. The plate (23) may be provided with a hole (24) to facilitate attaching side panels to the frame. Although the configuration of the prongs as depicted in FIG. 4 is preferred, it will be understood that a variety of shapes, sizes, and numbers of prongs may be utilized to achieve the same result.

Figure 5:
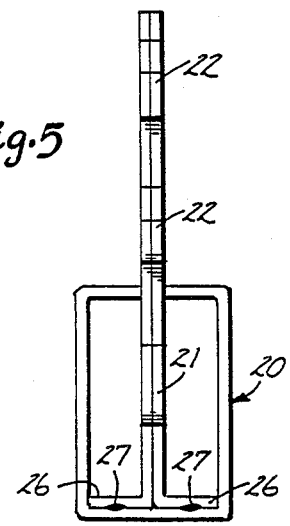
FIG. 5 is an end view of the crossbar shown in FIG. 4.

FIG. 5 depicts a preferred method of mounting the pronged plate (23) to the crossbar (20). Although the prongs may be manufactured from a single sheet of heavier gauge material, one preferred embodiment utilizes two sheets of lighter gauge steel, as depicted in FIG. 5, the sheets having ends bent away from each other as shown at (26) and there attached, as by spot welds (27), to the interior of the crossbar (20).

Figure 6:
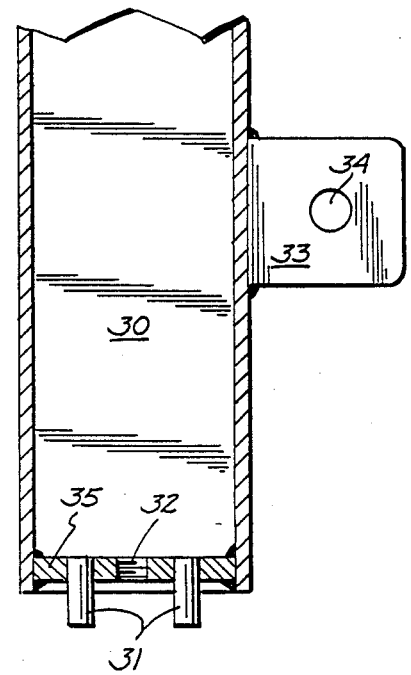
FIG. 6 is a broken away top cross-sectional view of the end of the other crossbar shown in FIG. 3 taken along line 6—6 thereof.

Referring to FIG. 6, the second crossbar (30) may be provided along its length with a tab (33) which has a hole (34); the tab and hole may be utilized for screw-mounting the various panels of the cabinet to the assembled frame. A variety of means may be used to provide rotational and translational stability of the crossbar (30) with respect to the vertical post (10). FIG. 6 depicts a preferred embodiment in which two spaced, longitudinally extending pins (31) are attached, as by welding, to an end wall (35) of the crossbar (30), and these pins are received in apertures (13) in the wall of the vertical post (10).

Figure 7:
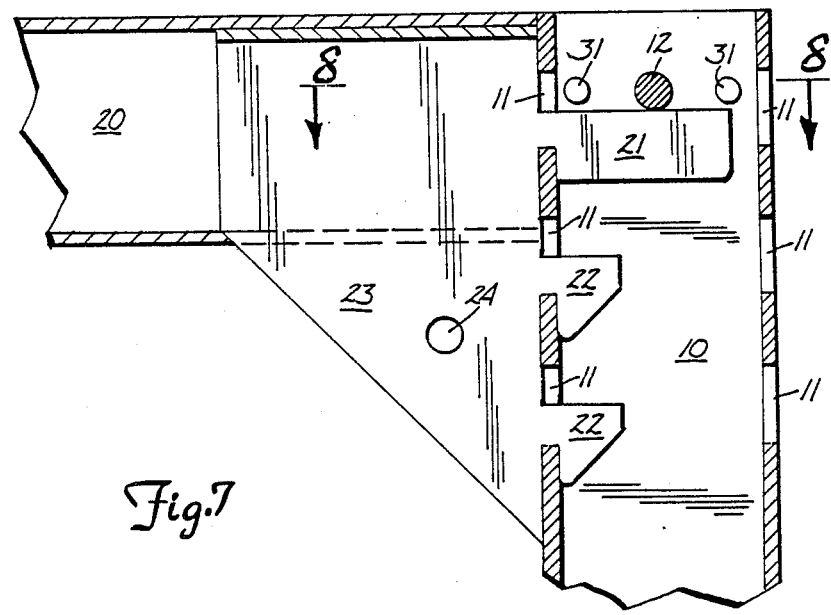
FIG. 7 is a broken away cross-sectional view of the joint of FIG. 3.

FIG. 7 illustrates the manner in which the crossbar (20) is locked into the post (10). The prongs (21) and (22) have been inserted through the slots (11) and moved vertically (in this case downwardly) to lock the crossbar (20) to the post (10). The locking bolt (12) is positioned so that it abuts the upper edge of the prong (21), preventing vertical movement of the prong (21) to thereby retain the crossbar (20) in its locked position.

Figure 8:
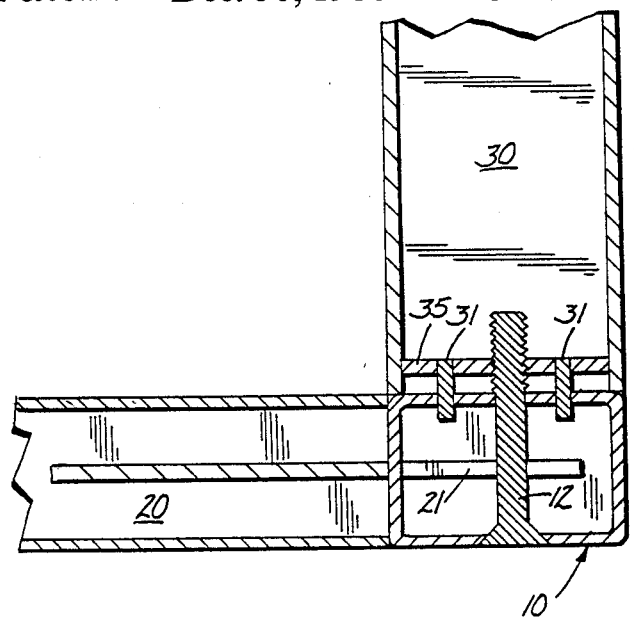
FIG. 8 is a broken away top cross-sectional view of the joint of FIG. 7 taken along line 8—8 thereof.

FIG. 8 further depicts the orientation of the various parts and depicts the two pins (31) that extend from the end wall (35) of the crossbar (30) through apertures in the vertical post (10). The bolt (12) is threadingly received in the end wall (35) of the crossbar (30) between the pins (31). Threads may be provided by tapping them into the aperture of the wall (35), by welding a nut (not shown) inside the end wall (35) aligned with the aperture, or by any other suitable means.

Another embodiment of the invention, involving the mounting of a drawer slide (40) between slotted vertical posts (10) of a preassembled cabinet unit, is shown in FIGS. 2 and 9-11. FIG. 9 depicts a preferred drawer slide. One end (48) of the drawer slide is provided with a pair of stationary prongs (41) which are received in the vertical slots (11) of one vertical post (10). The other end (47) of the drawer slide (40) is equipped with similar prongs (46), but these prongs are mounted on a removable or slidable plate (42) secured to the drawer slide (40) by a bolt (43). The drawer slide (40) desirably includes a C-shaped extrusion, the legs (52) of which define spaced rails. The plate (42) desirably is also generally C-shaped, the legs (49) of which slidably engage the rails. For ease of assembly, the plate (42) is preferably equipped with slots (44) in the legs (49) (see FIG. 10), making the plate and prongs lockingly adjustable lengthwise of the drawer slide. To mount the drawer slide in a preassembled cabinet framework, the rear prongs (41) are inserted into the slots (11) of one of the vertical posts (10). The bolt (43) is loosened and the plate (42) is adjusted lengthwise of the drawer slide. When the slide (40) is in proper position, the plate (42) may be moved forward, engaging its prongs (46) in the slots (11) of the other vertical post (10). The bolt (43) can then be tightened, securing the drawer slide rigidly in this position.

If desired, the plate (50) may be provided with a hole (45) instead of the slot (44) (see FIG. 10) and the drawer slide may have a series of holes alignable with the hole (45) as the plate is moved lengthwise of the drawer slide. In this embodiment, the bolt (43) is removed to allow the plate to move lengthwise of the drawer slide. Once the parts are properly positioned within the cabinet unit, the bolt (43) can be inserted through aligned holes and secured.

The disclosed invention therefore provides a cabinet framework can be quickly and easily assembled with minimal time or expertise. Likewise, the walls of the vertical posts (10) desirably are slotted throughout their lengths, permitting the cabinet to be quickly and easily adapted in size or shape to accommodate more or less storage space or drawers, etc. Although a preferred embodiment of the invention has been described, it should be understood that various changes, adaptations, and modifications may be made therein without departing from the spirit of the invention and the scope of the appended claims.

What is claimed is:

1. A cabinet framework comprising:
   a tubular vertical post having vertically spaced slots in a wall thereof, the post being generally rectangular in cross-section;
   a first crossbar having an end terminating in three prongs receivable in the slots of the vertical post, each prong including a vertical notch capable of rigidly engaging the post upon vertical movement of the prongs after insertion of the prongs into the slots;
   a second crossbar, mutually perpendicular to the first crossbar and to the vertical post, and including two spaced pins affixed to the end of the second crossbar, the pins received snugly in spaced apertures in the vertical post to prevent rotational and vertical movement of said crossbar with respect to the vertical post when the post and crossbar are fastened together; and
   a bolt extending through the post into the second crossbar for fastening the second crossbar to the post, the bolt being positioned adjacent the edge of one of said three prongs in a locked position to prevent vertical movement of said one prong and thus to retain the first crossbar in the locked position.

2. A cabinet framework comprising:
   a vertical post having vertically spaced slots in a wall thereof;
   a first crossbar having an end terminating in a prong receivable in one of the slots of the vertical post, the prong including means for locking the post and crossbar together in response to vertical movement of the crossbar with respect to the post;
   a second crossbar, disposed at right angles to the post and the first crossbar, and including engagement means engageable with the post for preventing rotational and vertical movement of the second crossbar with respect to the post; and
   a bolt extending through the post into the second crossbar for fastening the second crossbar to the post, the bolt positioned adjacent the edge of the prong in a locked position to prevent vertical movement of the prong and thus to retain the first crossbar in the locked position.

3. The framework of claim 2 wherein the first crossbar includes a second prong receivable in one of the slots of the vertical post, said second prong including means for locking the post and crossbar together in response to vertical movement of the crossbar with respect to the post.

4. The framework of claim 2 wherein the locking means comprises a vertical notch in said prong capable of rigidly engaging the post upon vertical movement of the prong after insertion of the prong into the slot.

5. The framework of claim 2 wherein the engagement means comprises two spaced pins affixed to the end of the second crossbar, the pins received snugly in spaced apertures in the vertical post.

6. A cabinet framework comprising:
   a vertical post having vertically spaced slots in a wall thereof;
   a first crossbar having an end terminating in two prongs receivable in the slots of the vertical post, each of said prongs including means for locking the post and crossbar together upon vertical movement of the crossbar with respect to the post;
   a second crossbar disposed at right angles to the first crossbar and to the vertical post, and including engagement means engageable with the post for preventing rotational and vertical movement of the second crossbar with respect to the post; and
   means for simultaneously fastening the end of the second crossbar to the vertical post and preventing vertical movement of one of the prongs of the first crossbar to maintain the first crossbar locked to the post.

7. The framework of claim 6 wherein the locking means comprises a vertical notch in each of said prongs capable of rigidly engaging the post upon vertical movement of the prongs after insertion of the prongs into the slots.

8. The framework of claim 6 wherein the fastening means comprises a bolt extending through the post into the second crossbar for fastening the second crossbar to the post, the bolt positioned adjacent the edge of one of said prongs in the locked position to prevent vertical movement of said prong and thus to retain the first crossbar in the locked position.

9. The framework of claim 6 wherein the engagement means comprises at least two spaced pins affixed to the end of the second crossbar, the pins received snugly in spaced apertures in the vertical post.

10. The framework of claim 6 further comprising:
    a second vertical post having vertically spaced slots in a wall thereof confronting slots of the first post;
    an elongated drawer slide having first and second ends, the first end carrying a prong receivable in one of the slots of one of the vertical posts; and
    a plate attachable to the second end of the drawer slide and having prongs receivable in the slots of the other vertical post.

* * * * *